March 29, 1966 H. M. SCHLICKE ETAL 3,243,738

FEED-THROUGH CAPACITOR

Filed Nov. 19, 1963

INVENTORS
HEINZ M. SCHLICKE
FLOYD A. BLOMDAHL
ALLAN V. KOUCHICH
GERALD R. PETERSON

BY Arnold J. Ericsen

ATTORNEY

United States Patent Office 3,243,738
Patented Mar. 29, 1966

3,243,738

FEED-THROUGH CAPACITOR

Heinz M. Schlicke, Fox Point, Floyd A. Blomdahl and Allan V. Kouchich, Milwaukee, and Gerald R. Peterson, Wauwatosa, Wis., assignors to Allen-Bradley Company, Milwaukee, Wis., a corporation of Wisconsin Filed Nov. 19, 1963, Ser. No. 324,699
11 Claims. (Cl. 333—79)

This invention relates to an improved feed-through capacitor used for very high and ultra high radio frequencies, and it more specifically resides in low pass filters for providing low reactance paths to ground for such frequencies when they are superimposed upon low frequency or direct current supply leads. Filters according to this invention may comprise a dielectric tube having electrodes disposed on one surface thereof in capacitive relationship with a plurality of separately spaced electrodes on the opposing surface and a ferrite body disposed along a portion of the tube in inductive relationship with the surface between the spaced electrodes.

As electronic equipment becomes more sophisticated, the hardware within said equipment must be improved. There has been a substantial demand for a compact high-frequency tubular feed-through capacitor and high-frequency low pass filter capable of filtering frequencies in the range of 30 megacycles per second to 1000 megacycles per second, and also capable of withstanding differences in potential substantially greater than can be reliably withstood by conventional feed-through capacitors and filters. This invention discloses a compact feed-through filter applicable within said frequency range for which the high voltage performance substantially surpasses that of conventional units.

It has frequently been found that when continuously operated at potentials proximate to the rated working voltage, the noise level and reliability of conventional feed-through filters do not meet the stringent requirements necessary for use in much modern day high-quality, highly sensitive electronic equipment. One cause for this is the fact that the working-voltage rating of dielectrics assumes a uniform electrical field distribution throughout the dielectric. However, the electrical strength of the dielectric is dependent upon the electrical stresses within the dielectric which in turn are dependent upon the density of the electrical field. Capacitive devices in which the electrical field is not uniform throughout the dielectric, as is the situation in conventional feed-through capacitors and filters, are subject to an unequal distribution of electrical stresses, said stresses being maximum within the region of maximum field concentration and minimum within the region of least field concentration. Consequently, within the region of maximum field concentration, the electrical stresses become greater than the electrical strength of the dielectric at a potential difference which is substantially less than would be the situation if the field were uniform and the stresses uniformly distributed throughout the dielectric as is presumed by the working-voltage rating.

This invention discloses a feed-through filter of which the electrical field is more evenly distributed, thus relieving the concentration of electrical stresses on the dielectric. Consequently, the voltage at which the unit may be used is substantially increased thus increasing the applicability and reliability of the unit over that of conventional feed-through filters.

When a capacitor is utilized in an electric circuit, it is well known that an electrical field exists within the dielectric of said capacitor when the electrodes thereof are at differing potentials. The magnitude of the electrical field is directly proportional to the potential difference. However, the distribution of the field within the dielectric medium is dependent upon the physical configuration of the electrodes and dielectric. If the two electrodes are of equal length and directly opposite each other, the electrical field is of uniform intensity throughout the dielectric (presuming the dielectric material is free of irregularities) except for edge effect near the ends of the electrodes. If the electrodes are not of equal length, not directly opposite one another, or if one electrode is segmented into a multiplicity of sections spaced apart from each other as is done in many cascaded feed-through capacitors and filters, the non-uniformity of the electrical field occurring near the edges of the electrodes becomes more pronounced. Since lines of electric flux are not continuous and must terminate on a conductor of different potential than that of the electrode from which the field originated, the field concentrates on the extreme end of the nearest segment of the electrode located on the opposite surface of the dielectric.

As previously mentioned, the concentration of the field at the edge of the electrode is undesirable in the use of feed-through capacitors and filters. Two significant undesirable effects of field concentration are the premature formation of corona and premature breakdown of the dielectric as they limit the use and reliability of the units.

It is well known that the difference in potential between the electrodes and the electrical field density are directly related. Also, the electrical stresses within the dielectric are directly related to the magnitude of the density of the electrical field. Consequently, as the potential difference is increased, the voltage stress on the dielectric is likewise increased. Furthermore, dielectric materials frequently are not uniform throughout, but are subject to irregularities such as internal air voids and surface microplasmas. These dielectric irregularities, due to a difference in dielectric constants between the dielectric and air (several thousand to 1 in the case of ceramics), cause a concentration of electrical field and electrical stresses at the irregularities. An increase in the field and stresses ultimately leads to the formation of corona within these irregularities thus causing "Townsend" discharge. If corona occurs, deterioration commences as ozone and oxides of nitrogen are formed which are powerful oxidizing agents and which chemically attack the dielectric material, ultimately resulting in electrical breakdown. Also, high velocity electrons, a product of corona discharge, will imbrittle and erode the dielectric causing early failure. Thus, concentration of the electrical field within one region results in a formation of corona discharge (also referred to as Townsend discharge) at a voltage substantially lower than would be necessary to create corona discharge if the field were uniform throughout. The voltage at which the corona, or Townsend discharge is formed, and the voltage at which breakdown occurs are generally referred to as discharge (or scintillation) voltage, and as breakdown voltage, respectively; both of which occur more rapidly if the electrical field is non-uniform.

An object of this invention is to provide a feed-through filter construction for which the discharge and breakdown voltages are substantially greater than that existing in prior art units, and which at the same time maintain the existing favorable physical and electrical properties of modern feed-through filters.

A specific object of the present invention lies in the provision of a feed-through filter having opposed electrodes, wherein one of said electrodes comprises a plurality of spaced-apart electrode segments to define an otherwise exposed dielectric surface between said segments, and wherein said dielectric surface is coated with a layer of a conducting material possessing a relatively high electrical resistance, whereby the electrical field within the dielectric proximate to the region covered by said resistive coating is of uniform intensity, thus decreasing the electrical stresses which otherwise exist within said region of the dielectric.

Other objects and a fuller understanding of the invention may be had by referring to the description and claims taken in conjunction with the accompanying drawings, in which:

Figures 1, 2, 3:
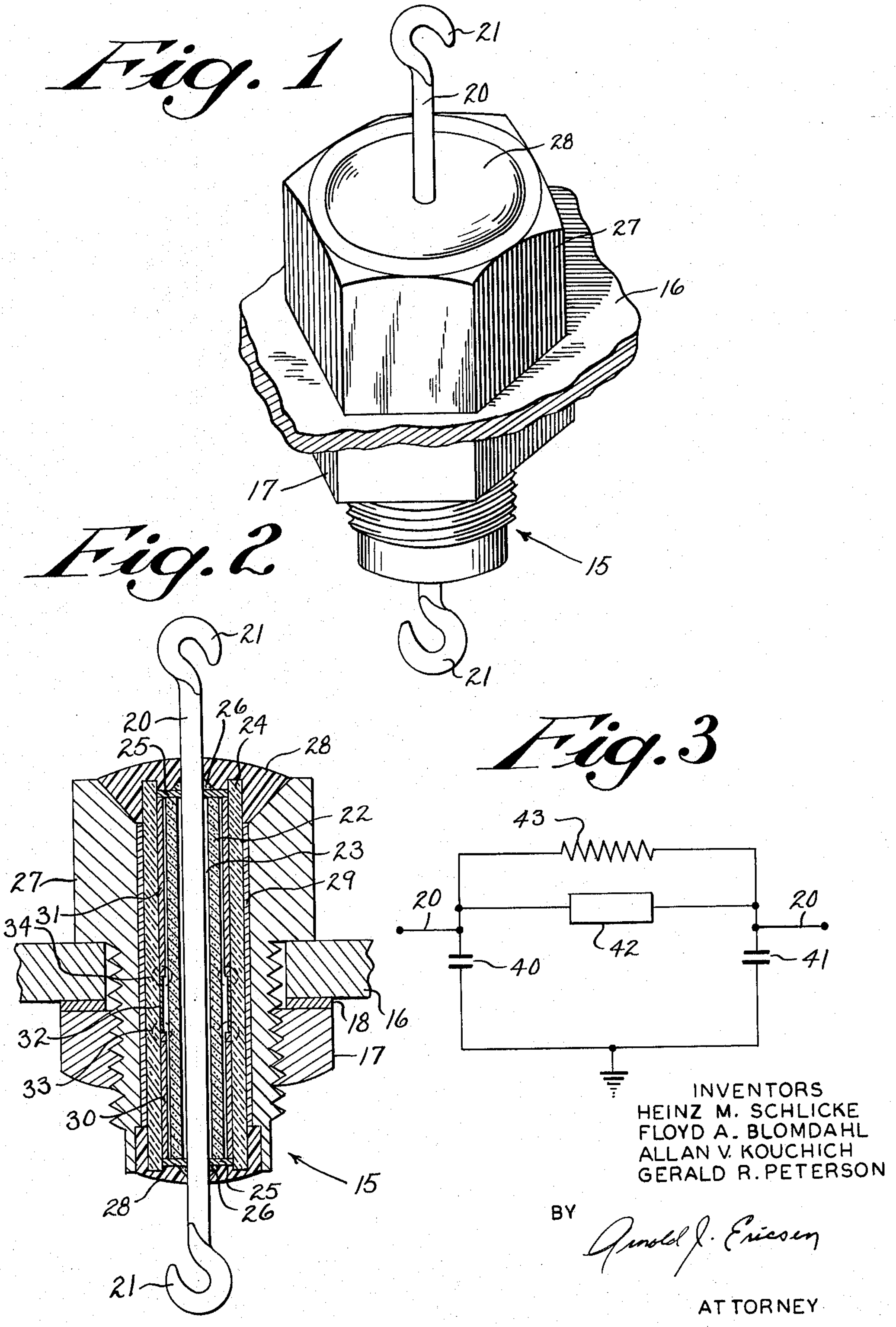
FIG. 1 illustrates, in perspective, a bolt-mounted feed-through capacitor embodying the principles of the invention.
FIG. 2 is an axial sectional view of the capacitor of FIG. 1.
FIG. 3 illustrates an equivalent diagrammiatc circuit for the embodiment of the device shown in FIG. 2.

Referring now to the details of the drawing, and with particular reference to FIGS. 1 and 2, the invention may be embodied in a conventional bolt-mounted tubular feed-through filter. The filter is designated generally by the reference character 15, and is indicated in FIG. 1 as being mounted in operative position upon a portion 16 of a shielding enclosure or chassis. The combination of the nut 17 and with the washer 18 (see FIG. 2) acts as a mechanical and electrical connection of the filter to the chassis 16. As further illustrated in the view of FIG. 2, it will be observed that the unit comprises a feed-through conductor 20 having connecting terminals 21 at opposite ends attached thereto. The conductor 20 is surrounded by a tubular sleeve 22 of ferri-magnetic material having an internal bore 23 slightly larger than the conductor 20 to readily accommodate the conductor 20 in accordance with conventional manufacturing tolerance limitations. Surrounding the sleeve 22 is a second tubular sleeve 24 formed from an insulating material, preferably a ceramic having a high dielectric constant. The aforementioned tubular sleeves 22, 24 and the feed-through conductor 20 are maintained in fixed relationship by a pair of axially spaced metallic washers or spiders 25. The feed-through conductor 20 is secured mechanically and electrically to each of the washers or spiders 25 by means of solder connections 26. Connection to circuit elements is provided for by means of the aforementioned terminals 21 and the threaded casing 27 which, as illustrated in FIG. 1, is mounted upon the shielding enclosure 16, thus providing an electrical path to the chassis for the high frequency currents passing through the filter. The unit is sealed about the end surfaces by the incorporation of an epoxy resin 28 disposed thereon.

The capacitor elements are formed on the inner and outer surfaces of the ceramic sleeve 24 by electrode 29 on the outer surface and electrodes 30 and 31 on the inner surface. It may be observed that the inner electrodes are connected by resistive element 32, which will be discussed subsequently in greater detail. The introduction of resistive element 32 is a feature of this invention as set forth in FIG. 2, distinguishing it from existing feed-through filters. It may be noticed that the electrode 29 extends over a substantial part of the outer surface and forms a common electrode for the separate capacitors formed by inner electrodes 30 and 31.

When incorporated in a circuit, the radio frequency equivalent circuit of the unit depicited in FIG. 2 appears as shown in FIG. 3. The capacitor symbols 40 and 41 represent the relationships between electrodes 29 and 30, and 29 and 31. The rectangular symbol 42 represents the radio frequency and direct current impedance offered by the conductor 20 and the surrounding ferri-magnetic sleeve 22. Symbol 43 represents the resistive element 32 applied to the dielectric tube 24 between electrodes 30 and 31.

The undesirable non-uniformity of the electrical field as it exists in existing feed-through capacitors and filters was discussed hereinabove. Referring to FIG. 2, inner terminating edges of electrodes 30 and 31, designated by 33 and 34, respectively, represent the points of concentration of the electrical field in the absence of a conductive path between electrodes 30 and 31. Prior art feed-through filters are constructed so that the surface of the dielectric tube between the electrode 30 and 31 is exposed, resulting in concentration of the field at points 33 and 34, and thus a region of high field concentration within the dielectric exists. The undesirable effects of the field concentration due to the placement of the electrodes is magnified by the local irregularities within the dielectric which as previously discussed are also points of high field concentration notwithstanding the placement of the electrodes. Thus, in conventional units there exist points of high field concentration within a region already subject to high field concentration. As the magnitude of the potential difference between the opposing electrodes is increased, the density of the electrical field at the concentration points is likewise increased and consequently the energy and velocity of the discharges within the irregularities increased. Ultimately the intensity of the electrical field at the points of concentration reaches a magnitude such to give rise to the formation of corona thus causing the unit to become noisy. Also, the action of the corona discharge upon the walls of the dielectric within the irregularity regions cause deterioration of the dielectric material. Consequently, the non-uniformity and concentration of the electrical field at the inner terminating ends of the electrode segments results in corona discharge and breakdown of the dielectric at a potential difference substantially less than would cause corona discharge and breakdown if the field was uniform throughout the dielectric.

This invention contemplates the introduction of a conductive path between electrodes 30 and 31 possessing a resistance of required magnitude, thus remedying the aforementioned problem of field concentration due to the placement of the electrodes without sacrificing any of the desirable features of prior art feed-through filters and without making any increase in the outer dimensions of the units.

It is fundamental that wherever there is an electrical field, there is also a corresponding electromagnetic field existing in a plane transversely of said electrical field. Also, there are equipotential lines (frequently referred to as equipotential surfaces) coinciding with the electromagnetic field. By introducing the resistive element 32 between and electrically connected to electrodes 30 and 31, a conductive path is provided for between said electrodes, thus establishing equipotential lines within said path. The equipotential lines within the conductive path attract the electrical field to the surface of 32, and points 33 and 34 are relieved of the otherwise high concentration effects of the electrical field caused by the placement of electrodes 30 and 31. Consequently, the dielectric 24 is relieved of electrical stresses within the region between the electrodes 30 and 31. The relief of said stresses results in an increase of the ultimate discharge voltage and breakdown voltage of the dielectric, thus increasing the life and improving the applicability and reliability of the capacitor.

The composition makeup and resistive value of the conductive element 32 is not critical. Though by no means exclusive, curable materials possessing an epoxy base and particles of carbon black have been satisfactorily utilized. The lower ohmic-value limit of the element is determined by the radio frequency resistance (represented by symbol 42 of FIG. 3) offered by the ferri-magnetic sleeve 22 surrounding the conductor 20. A value less than the lower limit will attract much of the radio frequency current that would otherwise pass through sleeve 22, resulting in a loss of the filtering effect of the ferri-magnetic element of the filter. As is well known in the feed-through filter art, the introduction of ferri-magnetic loading between capacitors substantially dampens the inductive reactance which would normally result from the leads connecting successive capacitors and produces instead an impedance that is primarily resistive in the frequency range contemplated. A resistive value of tenfold the radio frequency resistance of the ferri-magnetic material has been proven to be an acceptable and effective lower value.

The upper ohmic value of the resistor 32 is not critical. However, as the depth of the conductive element is decreased the ohmic value is increased, and in the frequency range, as here involved, skin effect must be taken into consideration. Consequently, the depth of the coating must be as thick as the skin depth for the frequencies to be filtered. Also, it is necessary that the metallic coating be of sufficient depth and distribution so that the entire surface of the sleeve 24 between the electrodes 30 and 31 is completely covered to avoid the existence of surface voids. The existence of surface voids results in points of high field concentration. Thus for maximum performance, it is necessary that the conductive coating 32 be of sufficient depth to avoid skin effect and surface void problems, but not so thick that the resistance is less than tenfold the radio frequency resistance of the ferri-magnetic material.

The foregoing illustration deals only with bolt-mounted feed-through capacitors utilized as low pass filters. This arrangement has been shown for illustration purposes only and not of limitation.

As illustrated in United States Patent No. 3,035,237, issued to Heinz H. Schlicke on May 15, 1962, for "Feed-Through Capacitor" and assigned to the same assignee as the present invention, feed-through filters may have numerous constructions as to physical placement of the electrodes with respect to the ceramic dielectric and the placement of the ceramic dielectric with respect to the ferri-magnetic material. Though the discussion and diagrams contained herein have centered about the situation in which the common electrode is on the outer surface of the dielectric sleeve and the ferri-magnetic material on the inside of the dielectric sleeve, proximate to the feed-through conductor, this invention is not so limited. Similar results are achieved where the common electrode is disposed on the inner surface and the plurality of electrodes on the outer surface of the dielectric. Also, the high voltage performance of feed-through filters of which the dielectric is placed on the inside of the ferri-magnetic material closest to the feed-through conductor is improved by incorporating the aforementioned principles.

It should also be noted that in FIG. 2, the end surface of the dielectric sleeve 24 is free from contact with electrodes 29, 30 and 31. Many feed-through capacitors and filters are constructed such that the electrodes disposed on one of the longitudinal surfaces extend to the end of said surface and continue in a radial direction on the end surface and terminate thereon. Examples of filters constructed in such manner are clearly demonstrated in FIGS. 4 and 9 of the previously mentioned United States Patent No. 3,035,237. The advantages of incorporating the principles of this invention are equally applicable to units possessing electrodes disposed in such manner. Accordingly, the scope of these inventions should be determined on the basis of the following claims:

We claim:

1. In a feed-through filter for use at high frequencies and comprising a dielectric tube having metallic electrodes disposed on one of the cylindrical surfaces thereof and in capacitive relationship with a plurality of separately spaced metallic electrodes on the opposing cylindrical surface, said electrodes being spaced apart to leave a band on the tube exposed, and a ferrite body disposed axially along a portion of the tube and in inductive relationship with the surface between said spaced electrodes: the combination therewith of an electrically resistive coating comprising a vehicle having dispersed therein particles of conductive material applied to the exposed surface between said spaced electrodes to provide a conductive bridge between the spaced electrodes, said bridge having an ohmic value substantially greater than the high frequency resistance of the ferrite body; whereby the density of the electrical field existing within the dielectric tube proximate to the area covered by said bridge will be decreased, thus in turn decreasing the voltage stresses within said area of the dielectric, and thereby improve the ultimate breakdown and discharge voltages of said feed-through filter.

2. A filter in accordance with claim 1 in which the ferrite body is disposed on the inside of the dielectric tube.

3. A filter in accordance with claim 1 in which the ferrite body is disposed on the outside of the dielectric tube.

4. A feed-through filter for use at high frequencies comprising a dielectric tube having a metallic electrode disposed on one of the cylindrical wall surfaces thereof and in capacitive relationship with a plurality of separately spaced metallic electrodes on the other cylindrical wall surface, said electrodes being spaced apart to leave a band of the dielectric tube exposed, the opposed ends of each of the electrodes being disposed on said tube to terminate within the axial length of the cylindrical wall surface on which each is respectively disposed, a ferrite body disposed axially along a portion of the tube and in inductive relationship with the exposed dielectric surface between said spaced electrodes, and an electrically resistive coating comprising a vehicle having dispersed therein particles of conductive material applied to the ceramic surface between said spaced electrodes to provide a conductive bridge between the electrodes, said bridge having an ohmic value substantially greater than the high frequency resistance of the ferrite body.

5. A capacitor in accordance with claim 4 in which the ferrite body is disposed on the inside of the dielectric tube.

6. A capacitor in accordance with claim 4 in which the ferrite body is disposed on the outside of the dielectric tube.

7. A feed-through filter for use at high frequencies comprising a dielectric tube having a metallic electrode disposed on one of the cylindrical wall surfaces thereof and in capacitive relationship with a plurality of separately spaced metallic electrodes on the other cylindrical wall surface, said electrodes being spaced apart to leave a band of the dielectric tube exposed, the opposed ends of the electrodes on one surface being disposed on said surface to terminate within the axial length of the cylindrical wall surface on which each is respectively disposed, and the ends of the electrodes disposed on the opposing surface being extended beyond the longitudinal surface and in a radial direction to terminate on the end surface of the dielectric tube, a ferrite body disposed axially along a portion of the tube and in inductive relationship with the exposed dielectric surface between said spaced electrodes, and an electrically resistive coating comprising a vehicle having dispersed therein particles of conductive material applied to the ceramic surface between said spaced electrodes to provide a conductive bridge between the electrodes, said bridge having an ohmic value substantially greater than the high frequency resistance of the ferrite body.

8. A filter in accordance with claim 7 in which the ferrite body is disposed on the inside of the dielectric tube.

9. A filter in accordance with claim 7 in which the ferrite body is disposed on the outside of the dielectric tube.

10. A filter in accordance with claim 1 in which the ohmic value of the resistive coating is approximately ten times greater than the high frequency resistance of the ferrite body.

11. A filter in accordance with claim 1 in which the depth of the resistive coating is at least equivalent to the skin depth of the frequencies to be filtered.

References Cited by the Examiner

UNITED STATES PATENTS

| | | | |
|---|---|---|---|
| 2,464,376 | 3/1949 | Cohen et al. | 333—70 |
| 2,983,855 | 5/1961 | Schlicke | 317—242 |
| 3,035,237 | 5/1962 | Schlicke | 333—79 |

HERMAN KARL SAALBACH, *Primary Examiner.*

R. F. HUNT, *Assistant Examiner.*